(12) United States Patent
Inoue

(10) Patent No.: US 6,398,610 B1
(45) Date of Patent: Jun. 4, 2002

(54) DISPLAY PANEL PRODUCTION LINE

(75) Inventor: Yoshiyasu Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/470,398

(22) Filed: Dec. 22, 1999

(30) Foreign Application Priority Data

Jan. 8, 1999 (JP) .......................................... 11-002546

(51) Int. Cl.⁷ ............................................. G02F 1/333
(52) U.S. Cl. ...................................................... 445/66
(58) Field of Search .................... 445/24, 66; 349/187, 349/189

(56) References Cited

U.S. PATENT DOCUMENTS

| | | | |
|---|---|---|---|
| 4,443,927 A | * | 4/1984 | Colonius et al. ............... 29/563 |
| 5,867,388 A | * | 2/1999 | Okumura et al. ........... 700/112 |

FOREIGN PATENT DOCUMENTS

| | | |
|---|---|---|
| JP | 4-51138 | 4/1992 |
| JP | 7-235582 | 9/1995 |
| JP | 8-259193 | 10/1996 |
| JP | 8-313854 | 11/1996 |
| JP | 9-40111 | 2/1997 |

* cited by examiner

*Primary Examiner*—Kenneth J. Ramsey
(74) *Attorney, Agent, or Firm*—Scully, Scott, Murphy & Presser

(57) ABSTRACT

The present invention provides a display panel production line of increased efficiency by providing a relocation step area where display panels in a cassette used in the cutting step area are relocated into a cassette to be supplied to an injection step area while increasing the number of display panels, and the display panels in the cassette from the injection step area are relocated into a cassette to be supplied to a sealing step area while decreasing the number of display panels.

20 Claims, 11 Drawing Sheets

DISPLAY PANEL PRODUCTION LINE

BACKGROUND OF THE INVENTION

1. Field of the Invention

The present invention relates to a production line for producing a display panel such as a liquid crystal panel and in particular, to a display panel production line including a cutting step area for cutting a glass substrate into a size of display panel, an injection step area for filling the display panel with liquid crystal, and a sealing step area for sealing the liquid crystal injection opening, wherein the panel filled with the liquid crystal is carried in a cassette between the areas.

2. Description of the Related Art

Generally, display panels are used as output display units of electronic apparatuses. Among the display panels, liquid crystal panels are widely used for display of personal computers and word processors because of low power consumption, thin and small weight, and low voltage drive.

As shown in a perspective view and a front view of FIG. 9, two glass substrates, i.e., a TFT substrate 1 and a color filter substrate 2 are bonded together via a seal 3, leaving a gap of 5 to 6 micrometers. This gap is filled with liquid crystal. It should be noted that a liquid crystal injection opening 4 is provided at the lower end of the liquid crystal panel where no seal 3 is provided In general, such a liquid crystal panel is produced by the steps shown in FIG. 10. Firstly, a large-area glass substrate is subjected to washing, drying, orientation film printing, rubbing, seal printing, and the like, which will be referred to as a TFT substrate formation step 5. Thus, a TFT substrate 1 is produced. On the other hand, another large-area glass substrate is subjected to washing, drying, orientation film printing, rubbing, spacer distribution, and the like, which will be referred to as a color filter substrate formation step 6. Thus, a color filter substrate 2 is produced.

Next, the color filter substrate 2 is superposed on the TFT substrate 1 with a gap, which will be referred to as a superposing step 7. Thus two glass substrates are bonded to each other.

The large-area glass substrates are cut into a plurality of liquid crystal panels with a size corresponding to type 12 to type 15, which will be referred to as a cutting step 8. The cutting is performed by using a diamond cutter to scribe the surface of the TFT substrate 1 and the color filter substrate 2, after which a shock is applied so as to separate the liquid crystal panels along the scribe. A liquid panel which has been cut out has a configuration as shown in FIG. 9.

After the cutting step 8 complete, liquid crystal injection step 9 is performed to fill the liquid crystal panel gap with a liquid crystal material. This liquid crystal injection step 9 is performed as follows. Firstly, as shown in FIG. 11, a liquid crystal vessel 11 containing a liquid crystal material 10 and a plurality of liquid panels P is placed in a vacuum chamber 12 and the air is discharged from the vacuum chamber 12. Next, when the pressure in the vacuum chamber 12 has become sufficiently low, the liquid crystal injection opening 4 of the liquid crystal panel is immersed in the liquid crystal material 10, and then atmospheric air is introduced into the vacuum chamber 12 so as to be under atmospheric pressure. Thus, the gap is filled with the liquid crystal material 10 by the capillary phenomenon and by the pressure difference between the pressure inside the liquid crystal panel and the pressure of the vacuum chamber 12.

After injection of the liquid crystal material 10 is complete in the liquid crystal injection step 9, the liquid crystal injection opening 4 is sealed in the sealing step 13, thus sealing the liquid crystal material 10. The sealing step 13 includes wiping off, UV resin application, and UV radiation. After this, a polishing step, a polarizing plate attachment step, an inspection step are performed to complete the liquid crystal panel.

It should be noted that in the production line performing the aforementioned steps, a cassette is used for storing and carrying the liquid crystal panel after the cutting step 8. In general cassettes used have an identical outer configuration, so as to be able to contain various sizes of the liquid crystal panel. If the cassettes have different outer configurations, the automation line may be disturbed. Moreover, in order to carry panels of different sizes, a holding plate as a partition is moved to hold the panel in the cassette.

However, the conventional liquid crystal panel production steps have problems as follows.

These years, for the variety of application fields, a larger liquid crystal panel is required. Moreover, for assuring a wide angle of visibility and for increasing the display speed response, a smaller gap is required. In order to realize a large panel with a smaller gap, the time required for liquid crystal injection per a unit number of panels has greatly increased in comparison to the other steps. For example, the liquid crystal injection step 9 requires 4 or 5 times more than the cutting step 8 and the sealing step 13. Accordingly, in the liquid crystal panel production line, it is necessary to improve the time efficiency of the liquid crystal injection step 9.

Here, it can be considered to increase the number of liquid crystal injection apparatuses which are expensive in general or to use a cassette of larger outer configuration to store more panels. However, this may affect the other existing steps and the production line, and not preferable from the viewpoint of costs. Actually, it is necessary to improve the production efficiency of the entire production line.

SUMMARY OF THE INVENTION

It is therefore an object of the present invention provide a display panel production line capable of improving the production line so that a variety of liquid crystal panels including a large-area panel with a reduced gas can be produced in a single production line, even in an automated line using a normalized cassette for the respective steps.

The display panel production line according to the present invention (Claim 1) comprises: a cutting step area for cutting a glass substrate into a display panel size; an injection step area for injecting liquid crystal into the display panel; and a sealing step area for sealing a liquid crystal injection opening of the display panel which has been filled with the liquid crystal; wherein a predetermined cassette is used as a medium to contain and convey the display panel between the areas, the display panel production line further comprising a relocation area for converting the number of display panels contained in the cassette.

With this configuration, it is possible to process more liquid panels as a processing unit number in the liquid crystal injection step than in the cutting step and the sealing step. Moreover, this configuration can be used without modifying a cassette currently used in the cutting step and the sealing step.

As a result, when it is necessary to increase the processing unit number of the liquid crystal panels in the liquid crystal injection step, considering the variety of the liquid crystal panel types and improvement of the entire production line, the processing unit number can be increased in the relocation step area and when there is not such a need, the production line can be used without the relocation step area.

Accordingly, even when using a conventional production line as it is, there is no need of increasing the number of the liquid crystal injection apparatuses and it is possible to improve the liquid panel production step and the entire production line efficiency without affecting any other existing steps and the production line.

According to another aspect of the invention (Claim 2), the relocation step area includes a display panel relocation apparatus for relocating panels from a cassette exhausted from the cutting step area, into a cassette to be supplied to the injection step area. In this relocation, more panels are placed in the cassette to be supplied to the injection step than in the cassette exhausted from the cutting step area.

With this configuration, it is possible to process more liquid panels as a processing unit number in the liquid crystal injection step than in the cutting step and the sealing step. Moreover, this configuration can be used without modifying a cassette currently used in the cutting step and the sealing step.

As a result, when it is necessary to increase the processing unit number of the liquid crystal panels in the liquid crystal injection step, considering the variety of the liquid crystal panel types and improvement of the entire production line, the processing unit number can be increased in the relocation step area and when there is not such a need, the production line can be used without the relocation step area.

Accordingly, even when using a conventional production line as it is, there is no need of increasing the number of the liquid crystal injection apparatuses and it is possible to improve the liquid panel production step and the entire production line efficiency without affecting any other existing steps and the production line.

According to still another aspect of the invention (Claim 3), the relocation step area includes a display panel relocation apparatus for relocating panels from a cassette exhausted from the injection step area, into a cassette to be supplied to the sealing step area. In this relocation, less panels are placed in the cassette to be supplied to the sealing step than in the cassette exhausted from the injection step area.

With this configuration, it is possible to process more liquid panels as a processing unit number in the liquid crystal injection step than in the cutting step and the sealing step. Moreover, this configuration can be used without modifying a cassette currently used in the cutting step and the sealing step.

As a result, when it is necessary to increase the processing unit number of the liquid crystal panels in the liquid crystal injection step, considering the variety of the liquid crystal panel types and improvement of the entire production line, the processing unit number can be increased in the relocation step area and when there is not such a need, the production line can be used without the relocation step area.

Accordingly, even when using a conventional production line as it is, there is no need of increasing the number of the liquid crystal injection apparatuses and it is possible to improve the liquid panel production step and the entire production line efficiency without affecting any other existing steps and the production line.

According to yet still another aspect of the present invention (Claim 4), the relocation step area includes a first display panel relocation apparatus for relocating display panels from a cassette exhausted from the cutting step area, into a cassette to be supplied to the injection area while increasing the number of panels relocated; and a second display panel relocation apparatus for relocating display panels from a cassette is exhausted from the injection step area, into a cassette to be supplied to the sealing step area while decreasing the number of display panels relocated.

With this configuration, it is possible to process more liquid panels as a processing unit number in the liquid crystal injection step than in the cutting step and the sealing step. Moreover, this configuration can be used without modifying a cassette currently used in the cutting step and the sealing step.

As a result, when it is necessary to increase the processing unit number of the liquid crystal panels in the liquid crystal injection step, considering the variety of the liquid crystal panel types and improvement of the entire production line, the processing unit number can be increased in the relocation step area and when there is not such a need, the production line can be used without the relocation step area.

Accordingly, even when using a conventional production line as it is, there is no need of increasing the number of the liquid crystal injection apparatuses and it is possible to improve the liquid panel production step and the entire production line efficiency without affecting any other existing steps and the production line.

According to still another aspect of the present invention (Claim 5), the relocation step area includes a display panel relocation apparatus which relocates display panels from the cassette exhausted from the cutting step area, into a cassette to be supplied to the injection step area, while increasing the number of display panels relocated, and which relocates the display panels from the cassette exhausted from the injection area, into a cassette to be supplied to the sealing step area, while decreasing the number of display panels relocated.

With this configuration, it is possible to process more liquid panels as a processing unit number in the liquid crystal injection step than in the cutting step and the sealing step. Moreover, this configuration can be used without modifying a cassette currently used in the cutting step and the sealing step.

As a result, when it is necessary to increase the processing unit number of the liquid crystal panels in the liquid crystal injection step, considering the variety of the liquid crystal panel types and improvement of the entire production line, the processing unit number can be increased in the relocation step area and when there is not such a need, the production line can be used without the relocation step area.

Accordingly, even when using a conventional production line as it is, there is no need of increasing the number of the liquid crystal injection apparatuses and it is possible to improve the liquid panel production step and the entire production line efficiency without affecting any other existing steps and the production line.

According to yet another aspect of the present invention (Claim 6), there is provided a display panel production line as claimed in Claim 2 to Claim 5, wherein the display panel relocation apparatus comprises: a filled cassette supply mechanism for supplying a cassette containing the display panels in the longitudinal direction; an empty cassette exhaust mechanism for exhausting an empty cassette from which the display panels have been removed; an empty cassette supply mechanism for supplying a cassette to which the display panels are to be relocated; a filled cassette exhaust mechanism for exhausting the cassette to which the display panels have been relocated; and a display panel relocation unit for taking out display panels at a take-out station located at a transfer position between the filled cassette supply mechanism and the empty cassette exhaust mechanism and storing the display panels at a storage station located at a transfer position between the empty cassette supply mechanism and the filled cassette exhaust mechanism.

With this configuration, it is possible to automatically change the number of display panels relocated in a single cassette. That is, when a cassette containing liquid crystal panels are conveyed from the cutting step to the liquid crystal injection step, the liquid crystal panels are removed from the first cassette exhausted from the cutting step and then placed in the second cassette to be supplied to the liquid crystal injection while increasing the number of panels in the second cassette compared to the first cassette. Moreover, when the cassette is conveyed from the liquid crystal injection step to the sealing step, the panels are removed from the second cassette and relocated into a third cassette to be supplied to the sealing step while decreasing the number of panels in the third cassette. Moreover, the cassette which has become empty is automatically ejected and an empty cassette to contain liquid crystal panels is automatically supplied. Thus, relocation of liquid crystal panels can be performed with a high efficiency.

Accordingly, it is possible to increase the number of liquid crystal panels to be processed at once in the liquid crystal injection step without changing the number of liquid crystal panels processed in the other steps.

According to yet another aspect of the present invention (Claim 7), the display panel relocation unit is arranged almost at the center of the display panel relocation apparatus, so as to be sandwiched by a cassette supply entrance of the filled cassette supply mechanism and a cassette exit of the filled cassette to exhaust mechanism on one side and a cassette exit of the empty cassette exhaust mechanism and a cassette supply entrance of the empty cassette supply mechanism on the other side.

With this configuration, one side of the apparatus can be used for supply and eject of a cassette containing display panels and the other side can be used for supply and eject of an empty cassette.

Accordingly, when applying the display panel relocation apparatus to a production line, it is possible to separate an area handling a cassette containing display panels and an area handling an empty cassette. This enables to improve the efficiency of the production line.

According to yet another aspect of the present invention (Claim 8), the take-out station and the storage station have a cassette feed mechanism for modifying the position for taking out the display panels from the cassette and the position for storing the display panels into the cassette.

With this configuration, when taking out or storing display panels from/into a cassette, it is possible to shift to cassette position, so that only a predetermined number of display panels can be taken out or stored.

According to still another aspect of the present invention (Claim 9), the display panel relocation apparatus includes a cassette rotation mechanism provided in the cassette supply mechanism and the cassette exhaust mechanism.

With this configuration, when taking out display panes or storing display panels from/into a cassette, it is possible to change a cassette direction in a horizontal plane.

This increases the degree of freedom concerning the display panel take-out direction and storage direction with respect to the cassette.

According to yet another aspect of the present invention (Claim 10), the cassettes have identical external dimensions.

By using such cassettes, it is possible to improve the efficiency of the production procedure and production line without suppressing automation of the display panel production line.

According to yet still another aspect of the present invention (Claim 11), the cassette is constituted by a pair of outer frames, a plurality of slide shafts bridged between the outer frames, and a pair of display panel holding plates for holding the display panels, and at least one of the display panel holding plates can slide on the slide shaft and can be fixed at an arbitrary position.

By using such cassettes, it is possible to store display panels of various sizes. Accordingly, even when producing display panels of different sizes, it is possible to maintain automation of the display panel production line and to increase the efficiency of the production procedure and the production line.

According to yet another aspect of the present invention (Claim 12), the display panel relocation unit includes: a display panel vertical movement mechanism which can move between a location below the take-out station and a location between the storage station and support the bottoms of the display panels so as to take out upward the display panels from the cassette or store downward the display panels; a display panel holding mechanism for holding the bottoms and sides of the display panel taken out of the cassette; and a lateral feed mechanism which can move from a location above the take-out station to a location above the storage station.

With this configuration, it is possible to hold the top, bottom, and both sides of the display panels when relocating the display panels all at once. This enables to relocate the display panels without causing scars or scratches on the display panel surfaces.

According to yet still another aspect of the present invention (Claim 13), the display panel vertical movement mechanism includes a display panel support roller which can move along the bottom of the display panels.

With this configuration, it is possible to move the display panels up and down without touching the liquid crystal injection opening provided at the bottom of each display panel.

Accordingly, it is possible to prevent attachment of dusts to the liquid crystal injection opening.

According to still another aspect of the present invention (Claim 14), a wiper mechanism for removing stains from the display panel support roller is provided below the take-out station and below the storage station.

With this configuration, stains attached to the display panel roller can be removed only by a small displacement of the displacement panel vertical mechanism which moves between the locations below the take-out station and the location below the storage station and the display panel support roller moving along the bottoms the display panels.

Thus, it is possible to prevent attachment of dusts the liquid crystal injection opening.

According to yet another aspect of the present invention (claim 15), the display panel top support mechanism includes a display panel top pitch correction mechanism having two-plated comb-shaped member in which one plate can be slightly shifted with respect to the other plate.

With this configuration, when supporting the display panels, it is possible to correct the display panel top pitch and accordingly, it is possible to align the display panels when taking out the display panels from a cassette and storing the display panels into another cassette, According to yet another aspect of the present invention (Claim 16), the display panel holding mechanism includes a bottom receiving roller for supporting the bottom of the display panels and a side receiving roller for supporting the sides of the display panels.

With this configuration, after the display panels are lifted by the display panel vertical movement mechanism, it is possible to simultaneously support the display panel bottoms and side surfaces. Accordingly, after the display panels are lifted by the display panel vertical movement mechanism, the support roller can easily be removed.

According to still another aspect of the present invention (Claim 17), the wiper mechanism for removing stains from the bottom receiving roller is arranged at both ends of the lateral movement stroke orbit of the lateral feed mechanism.

With this configuration, stains attached to the bottom receiving roller can easily be removed only by a small displacement of the lateral feed mechanism and the display panel holding mechanism.

Accordingly, it is possible to prevent attachment of dusts to the liquid crystal injection opening.

According to still another aspect of the present invention (Claim 18), the display panel relocation unit includes a display panel side pitch correction mechanism having two-plated comb-shaped member in which one plate can be slightly shifted with respect to the other plate.

With this configuration, when supporting the display panels, a simple mechanism can correct the display panel side pitch and align the display panels when storing them into a cassette.

According to yet another aspect of the present invention (Claim 19), the display panel relocation unit is arranged with an inclination of small angle in the pitch direction of the display panels.

With this configuration, the display panels are all inclined by the gravity and the display panels are arranged with an identical pitch.

According to yet still another aspect of the present invention (Claim 20), the display panel production line further comprises a cassette positioning mechanism for correcting a stop position of the cassette at the take-out station and the storage station.

With this configuration, it is possible in jog mode to accurately determine the position of the cassette from which display panels are taken out or into which display panels are stored. This prevents breakage of the display panels when taking out or storing display panels from/into a cassette.

DESCRIPTION OF THE PREFERRED EMBODIMENTS

Description will now be directed to a display panel production line according to an embodiment of the present invention. Firstly, explanation will be given on a display panel relocate apparatus used in the display panel production line and then, on the display panel production line.

Figure 1:
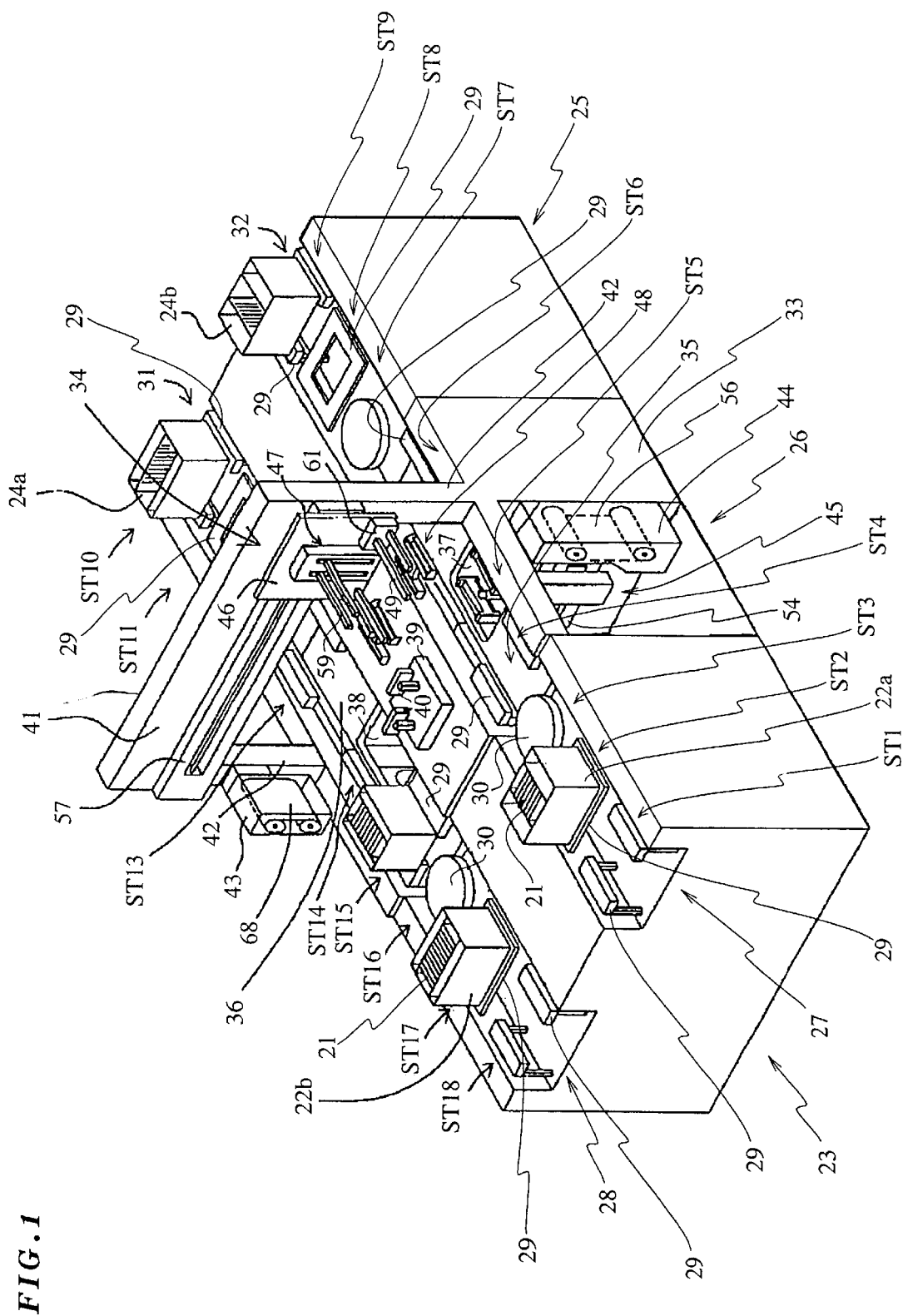
FIG. 1 is a perspective view of a display panel relocation apparatus according to the present invention.

As shown in a perspective view of FIG. 1, the display panel relocation apparatus used in the display panel 21 production line according to the embodiment of the present invention includes: a filled cassette conveying unit 23 for conveying filled cassettes 22a and 22b containing display panels 21 arranged in the longitudinal direction; an empty cassette conveying unit 25 for conveying empty cassettes 24a and 24b; and a display panel relocation unit 26 for taking a display panel 21 out of the filled cassette 22a and storing the display panel 21 in the empty cassette 24a. The display panel relocation unit 26 is arranged at a center portion of the display panel relocating apparatus so as to be sandwiched by the filled cassette conveying unit 23 and the empty cassette conveying unit 25.

The filled cassette conveying unit 23 includes: a filled cassette supply mechanism 27 (at the right hand in the figure) for supplying the filled cassette 22a to the display panel relocation unit 26; and a filled cassette discharge mechanism 28 (at the left hand in the figure) for discharging the filled cassette 22b in which the display panel 21 has been relocated by the display panel relocation unit 26.

The filled cassette supply mechanism 27 has a first station ST1, a second station ST2, and a third station ST3 where the filled cassette 22a is temporarily stopped when supplying the filled cassette 22a to the display panel relocation unit 26. The filled cassette 22a is conveyed via the first station ST1, the second station ST2, and the third station ST3 in this order. It should be noted that the filled cassette 22a is conveyed by an intermittent feed mechanism (not depicted). Each of the first station ST1 and the second station ST2 has a cassette holding table 29 for receiving the filled cassette 22a. The third station ST3 has a disc-shaped cassette rotation mechanism 30 for changing the direction of the filled cassette 22a in a horizontal plane. It should be noted that the third station ST3 can change the direction of the filled cassette 22a before conveying the filled cassette 22a to the display panel relocation unit 26, but it is also possible to conveying the filled cassette 22a to the display panel relocation unit 26 without changing its direction.

Similarly, the filled cassette discharge mechanism 28 has a sixteenth station ST16, a seventeenth station ST17, and an eighteenth station ST18 where the filled cassette 22b is temporarily stopped when discharging the filled cassette 22b from the display panel relocation unit 26. Note that in the filled cassette discharge mechanism 28, the filled cassette 22b is conveyed from the sixteenth station ST16 to the seventeenth station ST17 and then to the eighteenth station ST18, i.e., in the opposite direction to the filled cassette supply mechanism 27. Similarly as the filled cassette supply mechanism 27, the seventeenth station ST17 and the eighteenth station ST18 respectively have cassette holding tables 29 and the sixteenth station ST16 has a disc-shaped cassette rotation mechanism 30 capable of changing the direction of the filled cassette 22b in a horizontal plane.

On the other hand, the empty cassette conveying unit 25 includes: an empty cassette supply mechanism 31 (at the left hand in the figure) for supplying an empty cassette 24a to the display panel relocation unit 26; and an empty cassette discharge mechanism 32 (at the right hand in the figure) for discharging the empty cassette 24b from which the display panel 21 has been taken out by the display panel relocation unit 26.

The empty cassette supply mechanism 31 has almost identical configuration as the filled cassette supply mechanism 27, and has, although not depicted, a tenth station ST10, an eleventh station ST11, and a twelfth station ST12 where the empty cassette 24a is temporarily stopped when supplying the empty cassette 24a to the display panel relocation unit 26. The empty cassette 24a is conveyed from the tenth station ST10 to the eleventh station ST11 and then to the twelfth station ST12 in this order. Moreover, similarly as the filled cassette supply mechanism 27, the tenth station ST10 and the eleventh station ST11 respectively have cassette holding tables 29 for receiving the empty cassette 24a while the twelfth station has a disc-shaped cassette rotation mechanism 30 capable of changing the direction of the empty cassette 24a in a horizontal plane.

Similarly, the empty cassette discharge mechanism 32 has a seventh station ST7, an eighth station ST8, and a ninth station ST9 where the empty cassette 24b is temporarily stopped when discharging the empty cassette 24b from the display panel relocation unit 26. In the empty cassette discharge mechanism 32, the empty cassette 24b is conveyed to the seventh station ST7, eighth station ST8, and ninth station ST9 in this order, i.e., in the opposite direction to the empty cassette supply mechanism 31. It should be noted that similarly as the empty cassette supply mechanism 31, the eighth station ST8 and the ninth station ST9 respectively have cassette holding tables 29 for receiving the empty cassette 24b, and the seventh station ST7 has a disc-shaped cassette rotation mechanism 30 capable of changing the direction of the empty cassette 24b in a horizontal plane.

Next, explanation will be given on the display panel relocation unit 26.

The display panel relocation unit 26 consists of an installation basement 33 and a display panel relocation mechanism 34. The display panel relocation unit 26 is installed, as shown in FIG. 1, with inclination of approximately 1 degree. With this inclination of 1 degree, display panels 21 are inclined in the same direction and as will be detailed later, it is possible to obtain an identical pitch of the display panels 21 contained in the cassette.

The installation basement 33 includes: a first cassette conveying mechanism 35 (at the right on the top surface) for conveying the filled cassette 22a and the empty cassette 24b; and a second cassette conveying mechanism 36 (at the left on the top surface) for conveying the empty cassette 24a and the filled cassette 22b.

The first cassette conveying mechanism 35 has a fourth station ST4, a fifth station ST5 (take out station), and a sixth station ST6, so that the filled cassette 22a is conveyed to the fourth station ST4, the fifth station ST5, and the sixth station ST6 in this order by an intermittent conveying mechanism (not depicted). Here, the fifth station ST5 has a rectangular hole 37 for vertical movement of a display panel vertical movement mechanism 45 of the display panel relocation mechanism 34 as will be detailed later, and in this fifth station, the display panel 21 is taken out of the filled cassette 22a. Accordingly, the filled cassette 22a conveyed from the fourth station ST4 to the fifth station ST5 where the display panel 21 is taken out, advances to the sixth station ST6 as an empty cassette 24b. It should be noted that each of the fourth station ST4 and the sixth station ST6 has a cassette holding table 29 for receiving the filled cassette 22a or the empty cassette 24b. Furthermore, the fifth station ST5 has a cassette feed mechanism (not depicted) for shifting the position of the filled cassette 22a on the fifth station in the display panel pitch direction (in the longitudinal direction of the display panel relocation apparatus). By changing the position of the filled cassette 22a using this cassette feed mechanism, it is possible to increase or decrease the number of display panels 21 taken out of the filled cassette 22a during a single cycle operation.

On the other hand, the second cassette conveying mechanism 36 has a similar configuration as the first cassette conveying mechanism 35 and includes a thirteenth station ST13, a fourteenth station ST14, and a fifteenth station ST15. The empty cassette 24a is conveyed from the thirteenth station ST13 to the fourteenth station ST14 and then to the fifteenth station ST15 in this order. The fourteenth station ST141 has a hole 38 like the fifth station ST5. At this fourteenth station ST14, the display panel 21 is placed in the empty cassette 24a by the display panel relocation mechanism 34 as will be detailed later. Accordingly, the empty cassette 24a which has been conveyed from the 13th station ST13 to the 14th station ST14 is filled with the display panel 21 and then conveyed as the filled cassette 22b to the 15th station ST15. It should be noted that like the first cassette conveying mechanism 35, each of the 13th station ST13 and the 15th station ST15 has a cassette holding table 29 for receiving the empty cassette 24a or the filled cassette 22b. Furthermore, like the 5th station ST5, the 14th stations ST14 includes a cassette feed mechanism (not depicted). By changing the position of the empty cassette 24a using this cassette feed mechanism, it is possible to increase or decrease the number of the display panels stored in the empty cassette 24a during a single cycle operation by the display panel relocation mechanism 34

Moreover, the aforementioned installation basement includes a cassette positioning mechanism 39 between the 5th station ST5 and the 14th station ST14. This cassette positioning mechanism 39 corrects the stop position of the filled cassette 22a or the empty cassette 24a by using a sensor 40 to detect a groove provided on the side plate of the filled cassette 22a or the empty cassette 24a. For this correction, the filled cassette 22a or the empty cassette 24a is moved by the aforementioned cassette feed mechanism (not depicted).

Furthermore, the holding block 41 of the installation basement 33 includes a wiper mechanism 43 on its two legs for removing stains such as liquid crystal from a bottom receiving roller 62 which will be detailed later. In FIG. 1, for convenience of explanation, only one wiper mechanism 43 is depicted. This wiper mechanism 43 will be detailed later. The installation basement 33 also includes a similar wiper mechanism 44 below the 5th station ST5 and the 14th station ST14. This wiper mechanism 44 will also be detailed later.

Next, explanation will be given on the display panel relocation mechanism 34 built in the installation basement 33.

As shown in the perspective views of FIG. 1 to FIG. 3, the display panel relocation mechanism 34 includes: the display panel vertical movement mechanism 45 provided below the 5th station ST5; a lateral feed mechanism 46 provided in the holding block 41 of the display panel relocation mechanism 34; and a display panel top support mechanism 47, a display panel holding mechanism 48, and a display panel side pitch correction mechanism 49 which are mounted on this lateral feed mechanism 46.

Figure 3:
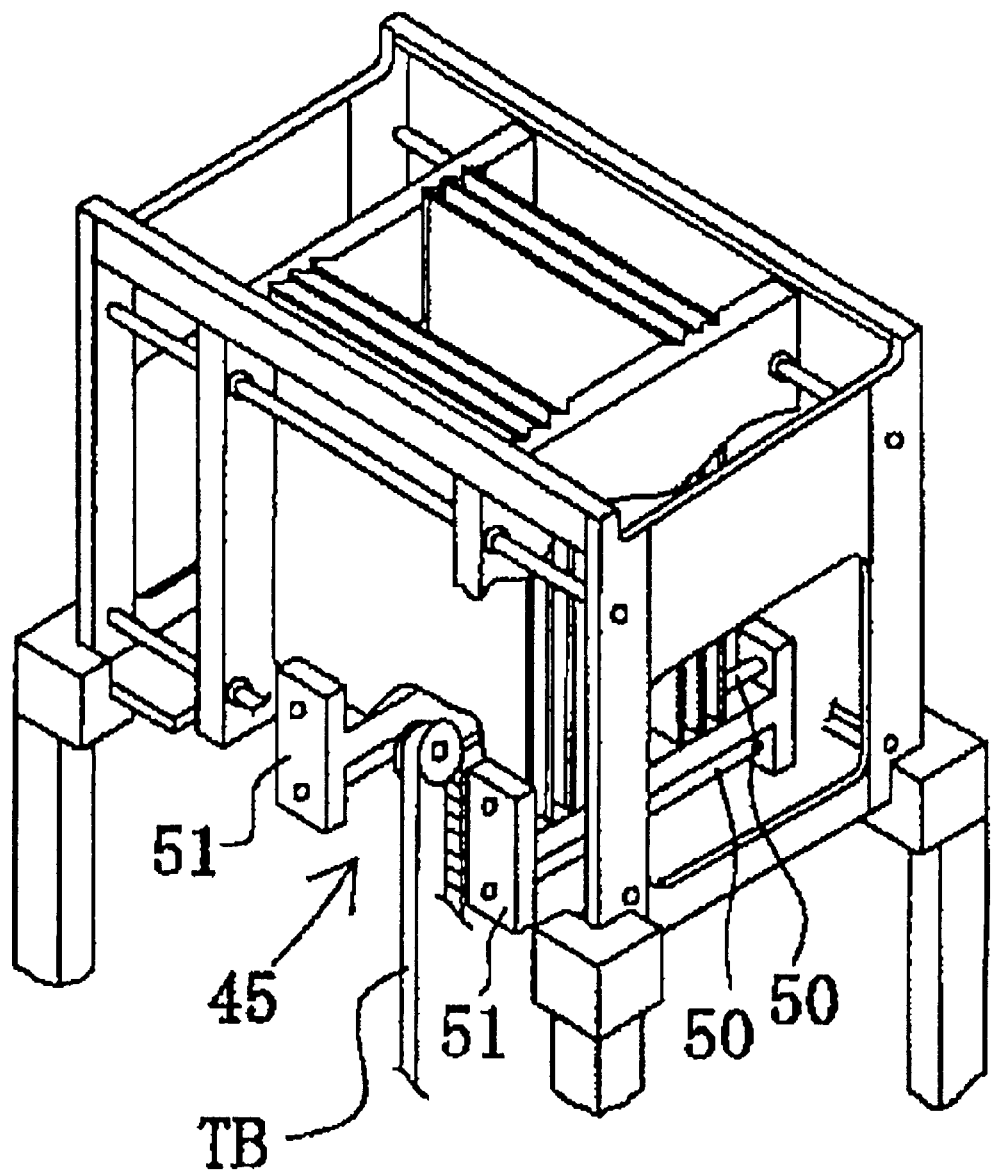
FIG. 3 is a perspective view of a cassette placed at the 5th station ST5 in the display panel relocation apparatus according to the present invention.
Figure 4:
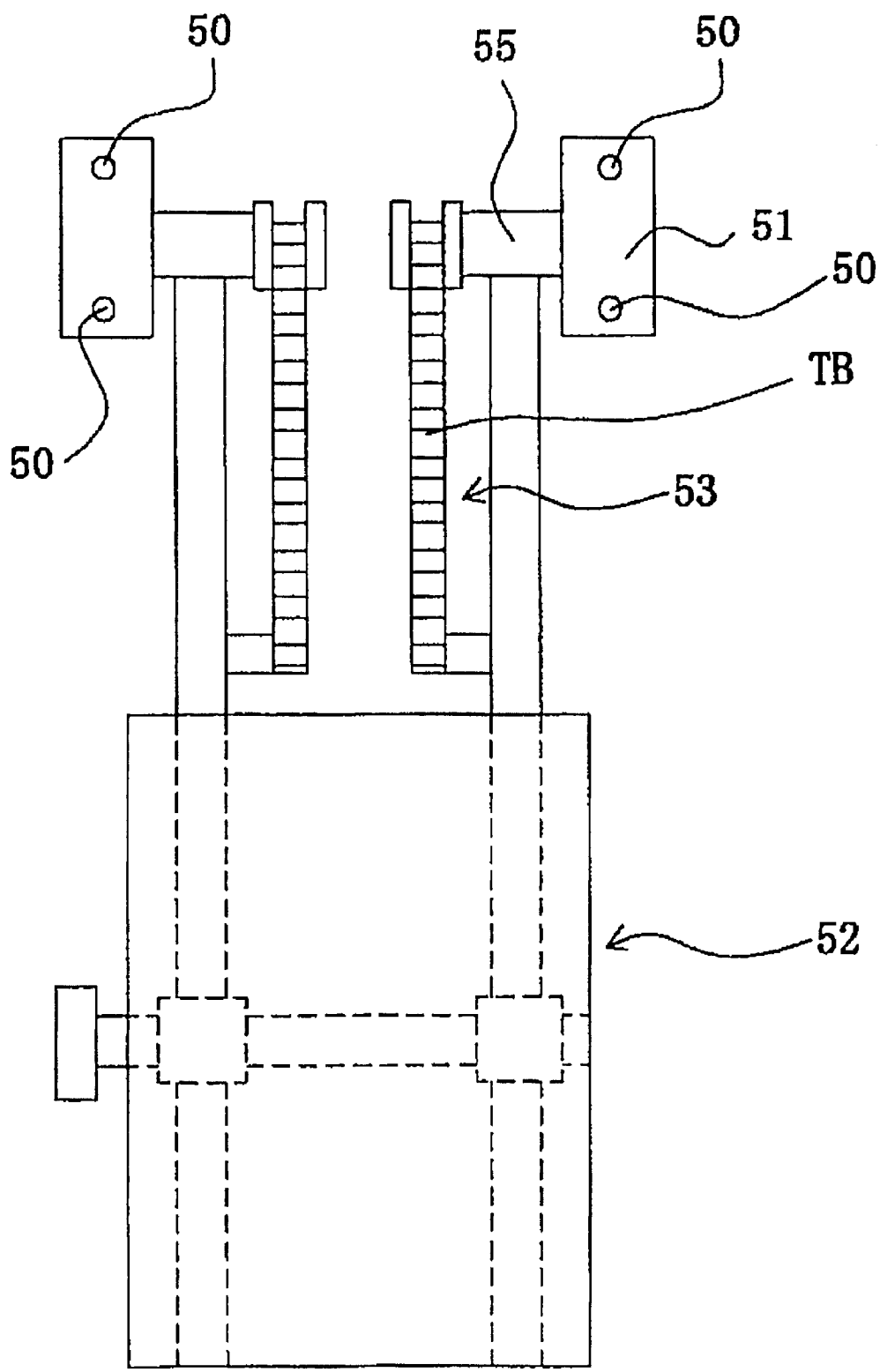
FIG. 4 is a front view of a display panel vertical movement mechanism of the display panel relocation apparatus according to the present invention.

As shown in the perspective view of FIG. 3 and in the front view of FIG. 4, the display panel vertical movement mechanism 45 includes a pair of roller guides 51 having an upper and a lower display panel support roller 50; a roller interval adjusting mechanism 52 for adjusting an interval between the display panel support rollers 50 in contact with the lower surface of the display panel 21; a roller guide rotation mechanism 53 for rotating the roller guide 51; and a motor (not depicted). The roller guide rotation mechanism 53 transmits the drive force of the drive motor via a timing belt TB to a rotary shaft 55 of the roller guide 51, so as to rotate the roller guide. Moreover, the display panel vertical movement mechanism 45 is driven by a drive motor (not depicted) to move along a groove of a lateral slide guide 54 between the position below the 5th station ST5 and the position below the 14th station ST14.

This display panel vertical movement mechanism 45 operates as a whole as follows. When taking out the display panel 21 from the filled cassette 22a which has stopped at the 5th station ST5, the panel bottom is supported by a pair of rollers 50 and the entire display panel vertical movement mechanism 45 is lifted so as to lift the display panel 21. Moreover, when storing the display panel 21 in the empty cassette 24a, its bottom is supported by the display panel support roller 50 and the entire display panel vertical mechanism is lowered to lower the display panel 21.

It should be noted that in the display panel vertical movement mechanism 45, the interval of the display panel support rollers can be adjusted by the roller interval adjusting mechanism 52, so that the display panel can be held, excepting the liquid crystal injection hole. This eliminates adhesion of dusts to the liquid crystal injection hole. Moreover, as shown in FIG. 1, in the installation basement 33, below the 5th station ST5 and the 14th station ST5, there are provided wiper mechanisms 44 having a roll-shaped wiper sheet 56. When the panel support roller 50 is stained with the liquid crystal or the like, the roller guide rotation mechanism 53 is driven to rotate the roller guide 51 by a half turn and then the roller interval adjusting mechanism 52 is operated to bring into abutment of the stained roller guide 51 with the wiper sheet 56, so as to remove the stains.

The lateral feed mechanism 46 is mounted on the slide guide 57 (for lateral feed) of the holding block 41 of the display panel relocation mechanism 34, and is driven by a drive motor (not depicted) to move along the groove of the slide guide 57 between the position above the 5th station ST5 and the position above the 14th station ST14.

This lateral feed mechanism 46 includes a display panel top support mechanism 47, a display panel holding mechanism 48, and a display panel side pitch correction mechanism 49.

Figure 2:
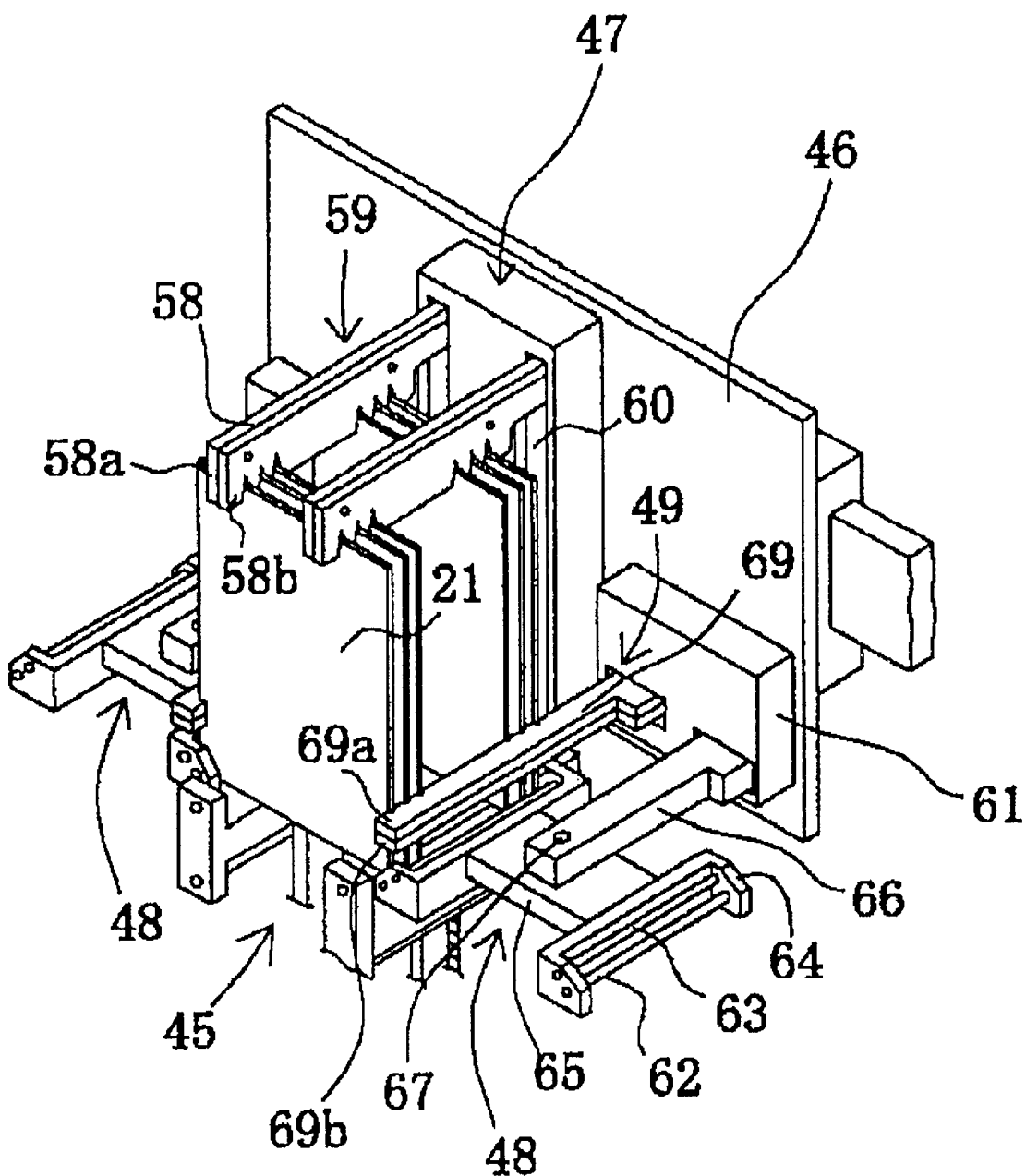
FIG. 2 is a perspective view of a display panel relocation mechanism of the display panel relocation apparatus according to the present invention.
Figure 5A:
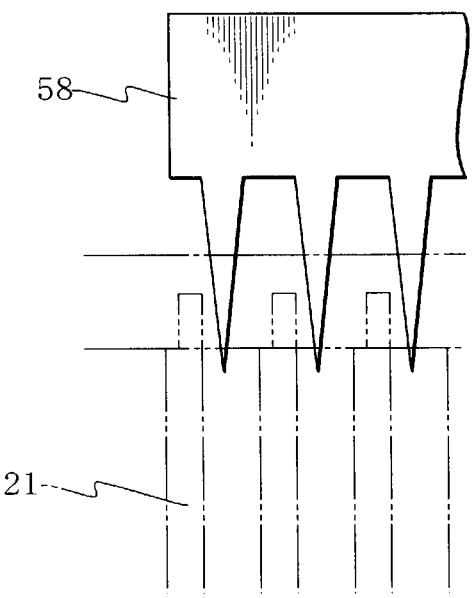
FIG. 5a is a front view of two-plated comb-shaped plate.
Figure 5B:
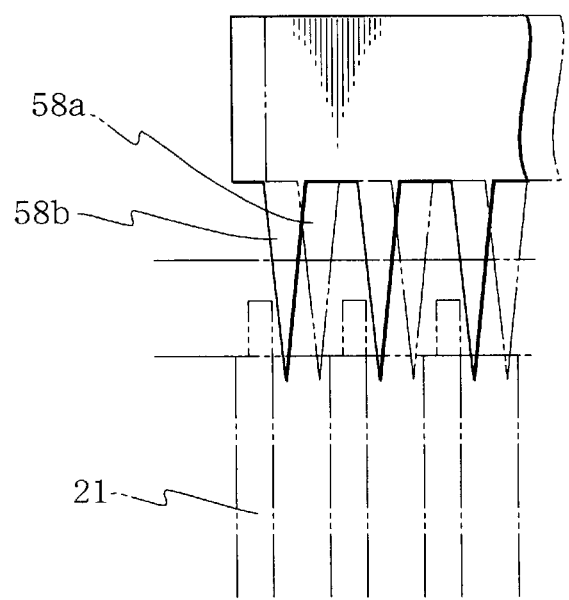
FIG. 5b is a front view of a two-plated comb-shaped plate in a slid state in the display panel relocation apparatus according to the present invention.

As shown in FIG. 2, the display panel top support mechanism 47 includes a display panel top pitch correction mechanism 59 having a pair of double-plated comb-shaped plates 58a and 58b, which move upward and downward along prolonged grooves 60. As shown in FIG. 5b, the plate 58b slightly slides with respect to the plate 58a.

Moreover, two of the display panel holding mechanisms 48 and the display panel side pitch correction mechanisms 49 are provided to sandwich the display panel top support mechanism 47, and they are arranged so as to slide in a lateral direction along the slide guide 61 of the lateral feed mechanism 46. The display panel holding mechanism 48 includes: a holding block 64 having the bottom receiving roller 62 and the side receiving roller 63; a rotary mechanism 65 having the holding block 64 at both ends; and an arm 66. The holding block 64 is rotated by the rotary mechanism 65 around a shaft 67 in a horizontal plane.

It should be noted that as has been described above, the installation basement 33 has wiper mechanisms 43 on the two legs 42 of the holding block 41 of the display panel relocation mechanism 34, so as to remove stains such as liquid crystal from the bottom receiving roller 62. (Note that in FIG. 1 only one wiper mechanism 43 can be seen.) This wiper mechanism has almost identical configuration as the aforementioned wiper mechanism 44. When the bottom receiving roller 62 is stained with liquid crystal or the like, the rotary mechanism is operated to rotate the holding block 64 by a half turn and then arm 66 is slid, so that the stained bottom receiving roller 62 is brought into abutment with the roll-shaped wiping sheet 68 of the wiper mechanism 43 so as to remove the stains.

On the other hand, the display panel side pitch correction mechanism 49, similarly as the display panel top support mechanism 47 shown in FIG. 2, has two-plated comb-shaped plates 69. The plate 69b can slightly be moved with respect to the plate 69a.

Moreover, the lateral feed mechanism 46 has a cassette positioning mechanism (not depicted). Using a sensor from above to detect an edge provided on the side plate of the filled cassette 22a or the empty cassette 24a which stops at the 5th station ST5 or the 14th station ST14, the stop position of the filled cassette 22a or the empty cassette 24a is corrected.

Figure 6A:
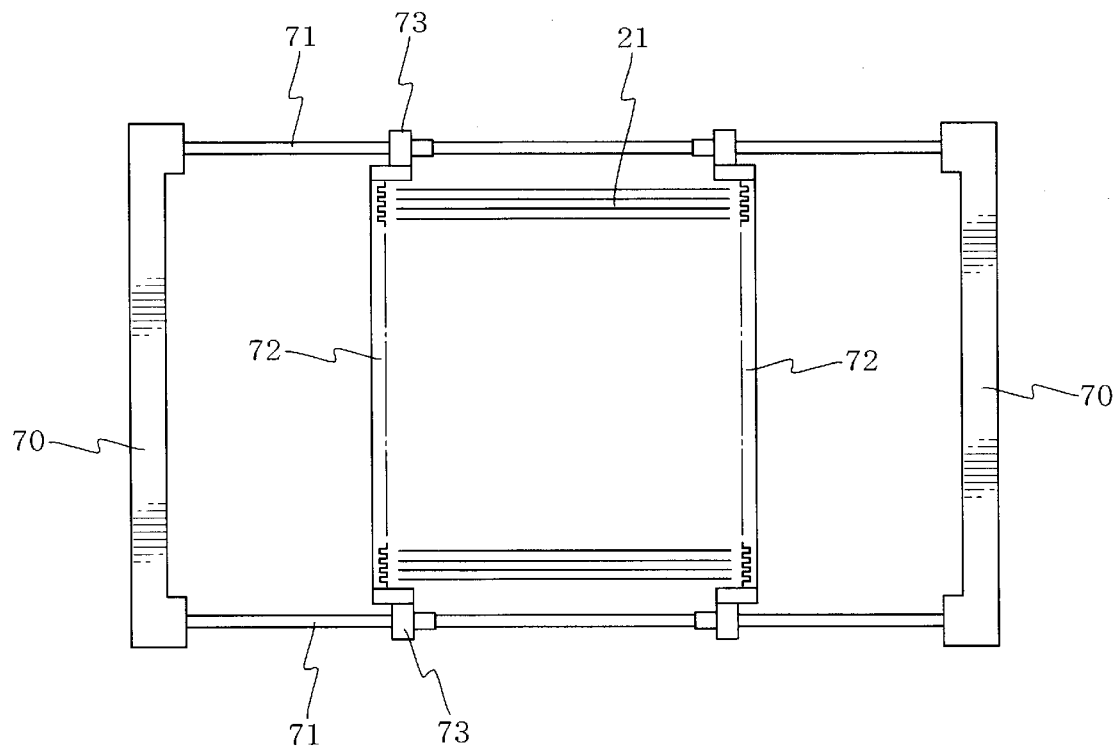
FIGS. 6a and 6b are a plan views of a cassette used in the display panel relocation apparatus according to the present invention.
Figure 6B:
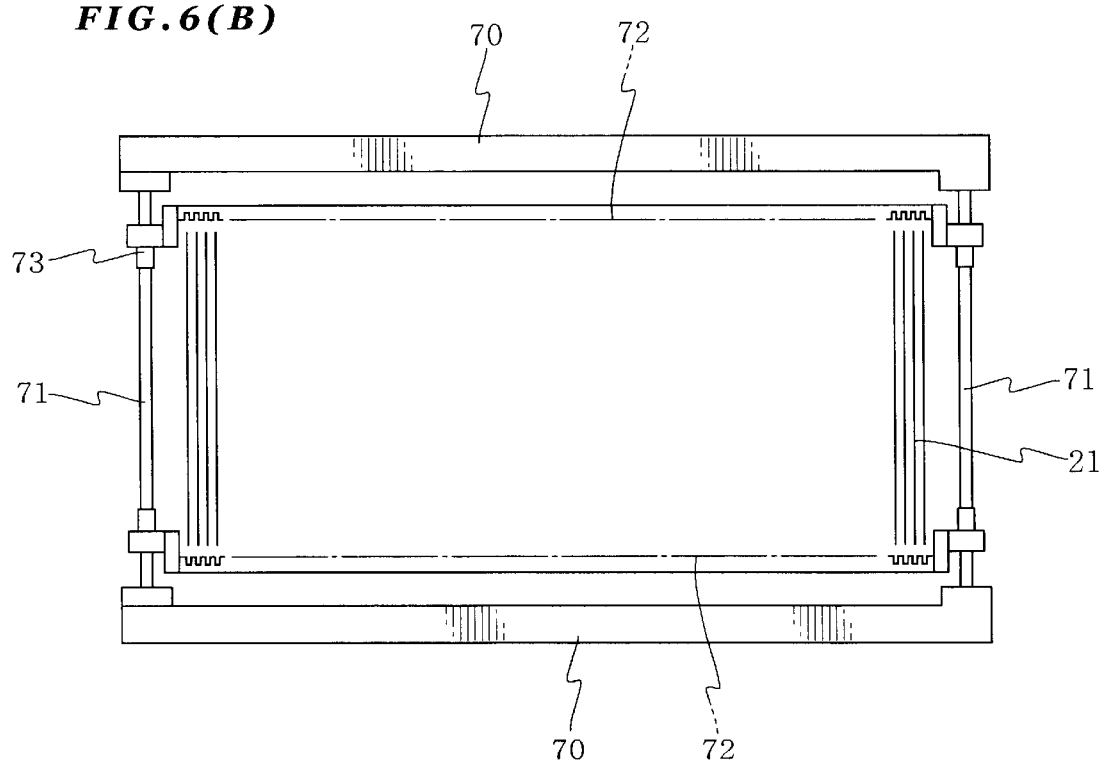

FIGS. 6A and 6B are plan views of the cassette used in the display panel relocation apparatus. FIG. 6A shows the filled cassette 22a or the empty cassette 24b shown in FIG. 1. Here, a lock mechanism 73 is omitted. The cassette shown in FIG. 6B is the filled cassette 22b and the empty cassette 24a shown in FIG. 1.

As shown in FIG. 6A, the filled cassette 22a and the empty cassette 24b includes: a pair of external frames 70; a plurality of slide shafts 71 bridged between the pair of external frames 70; and a pair of display panel holding plates 72 for holding a display panel 72. A lock mechanism 73 is arranged on the slide shaft 71 at the both ends of the display panel holding plate 72. The pair of display panel holding plates 72 sliding on the slide shaft 71 can be locked at an arbitrary position according to the size of the display panel. Thus, it is possible to store display panels of different sizes.

Figure 7:
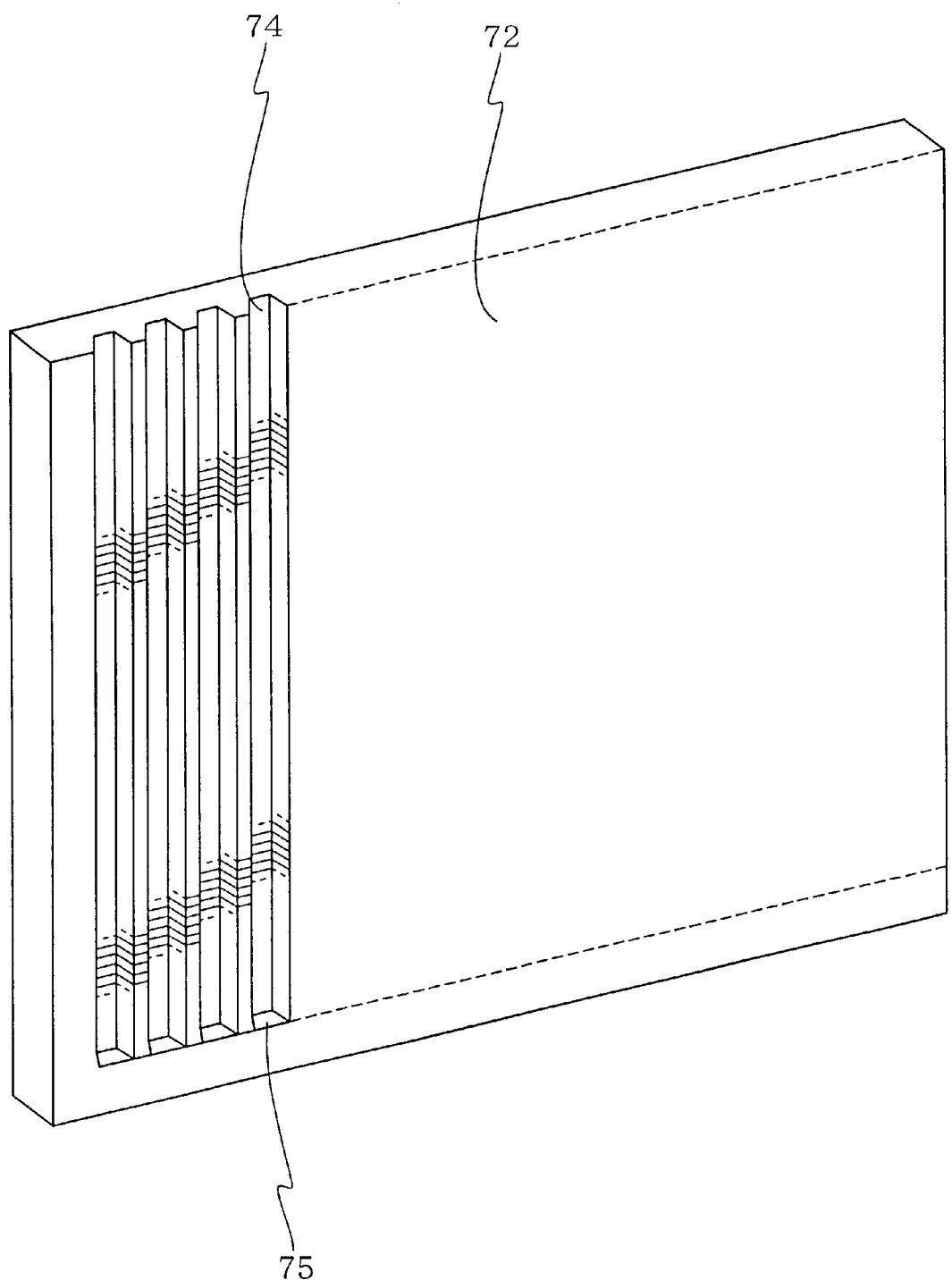
FIG. 7 is a perspective view of a display panel holding plate of the cassette used in the display panel relocation apparatus according to the present invention.

Moreover, as shown in a perspective view of FIG. 7, a plurality of U-shaped grooves are provided in the display panel holding plate 72, so that display panel 21 is inserted into the groove and held at the end of the groove 74.

And as shown in FIG. 6B, the filled cassette 22b and the empty cassette 24a has almost identical configuration as the filled cassette 22a and the empty cassette 24b shown in FIG.

6A, and identical external configuration. However, in the filled cassette 22a and the empty cassette 24b shown in FIG. 6A, the display panel holding plate 72 slides in the longitudinal direction of the cassette, whereas in the filled cassette 22b and the empty cassette 24a shownin FIG. 6B, the display panel holding plate 72 slide in the direction vertical to the longitudinal direction.

It should be noted that in the display panel relocation apparatus according to the present embodiment, the supply entrance and the exit of the filled cassette, i.e., the position of the 1st station ST1 and the 18th station ST18 are not to be limited to those shown in this embodiment but can be set in other positions according to the production line area arrangement so as to increase the cassette conveying efficiency.

Description will now be directed relationship between the display panel relocation apparatus according to the present embodiment and a display panel production line and its operation.

Figure 8A:
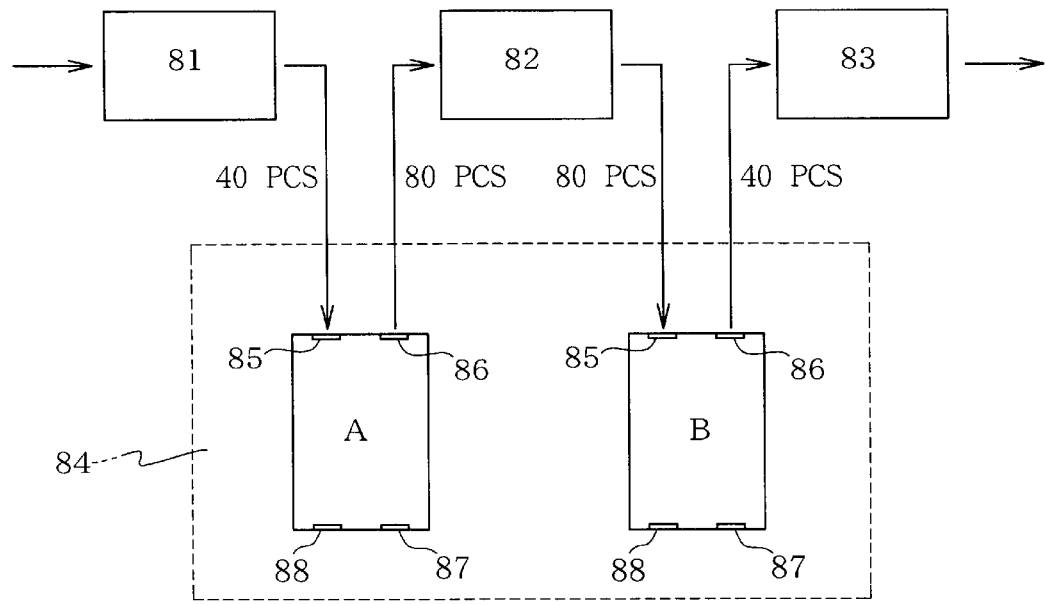
FIGS. 8a and 8b are block diagrams showing a relationship between the display panel relocation apparatus according to the present invention and a display panel production line.

As shown in FIG. 8a which is a block diagram of the liquid crystal panel production line, the display panel relocation apparatus shown in FIG. 1 is arranged as a relocation apparatus A and a relocation apparatus B in the vicinity of the cutting step area 81 for cutting the glass substrate into a liquid crystal panel size; the injection step area 82 for injecting liquid crystal into the liquid crystal panel; and a relocation step area 84 provided near a sealing step area 83 for sealing the liquid crystal injection hole.

In the relocation apparatuses A and B, the cassette supply entrance 85 and the cassette exit 86 respectively correspond to the 1st station ST1 and the 18th station ST18 of the display panel relocation apparatus shown in FIG. 1. The cassette supply entrance 87 and the cassette exit 88 respectively correspond to the 10th station ST10 and the 9th station ST9 in the display panel relocation apparatus shown in Fig. 1.

For example, two cassettes, each containing 40 liquid crystal panels are ejected from the cutting step area 81, and the total of 80 liquid crystal panels are relocated by the relocation apparatus A into an empty cassette to be supplied to the injection step area. And the 80 liquid crystal panels in the single cassette is then relocated by the relocation apparatus B into two empty cassettes to be fed to the sealing step area 83.

By performing the aforementioned operation in the relocation step area 84, it is possible to increase the number of liquid crystal panels to be processed in the liquid crystal injection step without changing the conventional number of liquid crystal panel (40 pieces) in the cutting step and the sealing step. Thus, without increasing the number of the liquid crystal injection apparatus, and without affecting the other existing steps and the production line, i.e., by using the conventional production line, it is possible to increase the efficiency of the production line.

Figure 8B:
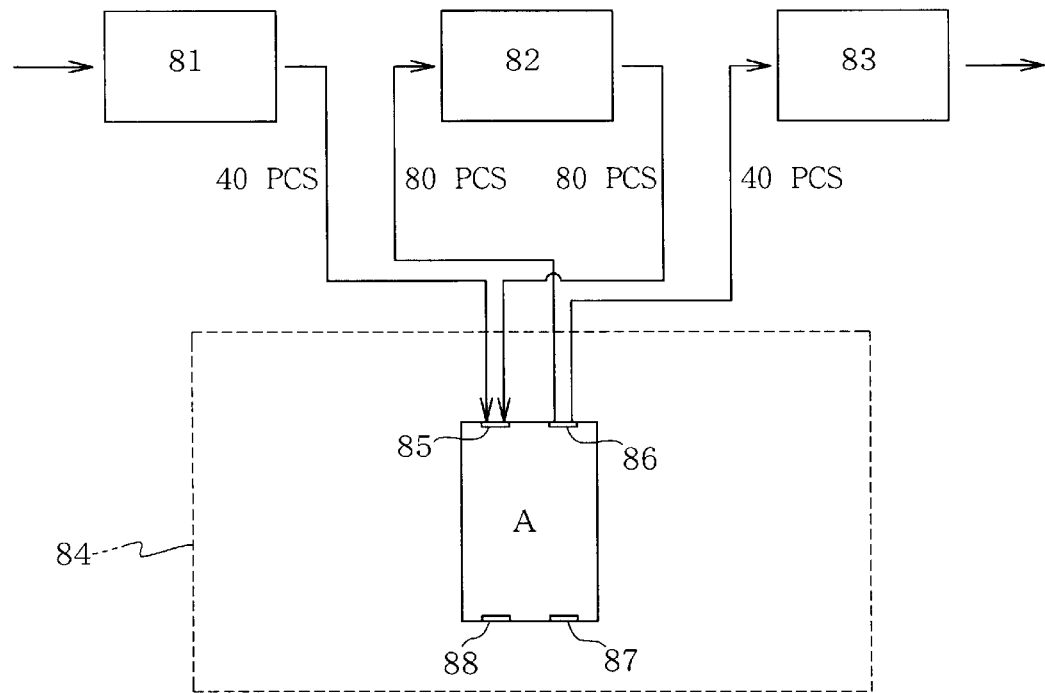
Figure 9A:
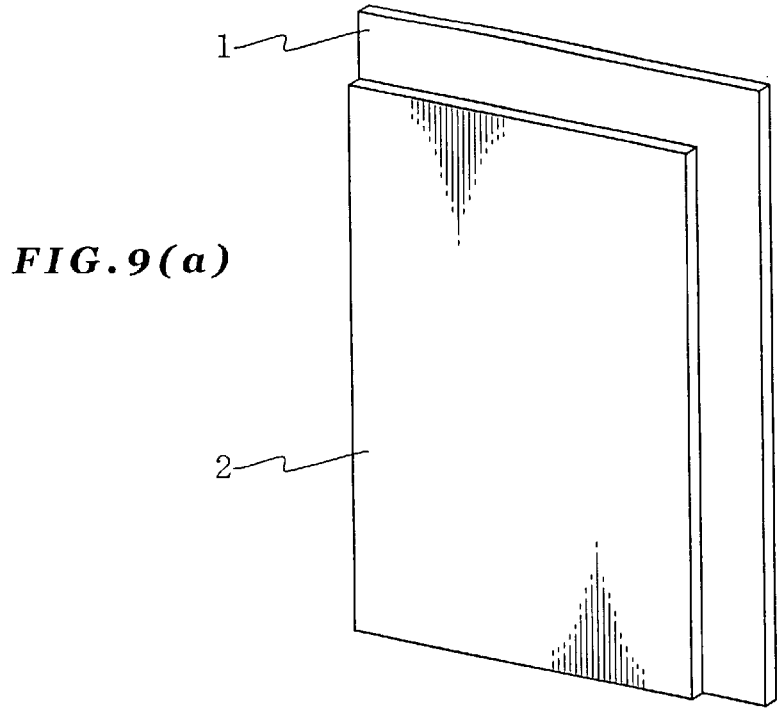
FIG. 9(a) gives a perspective view.
Figure 9B:
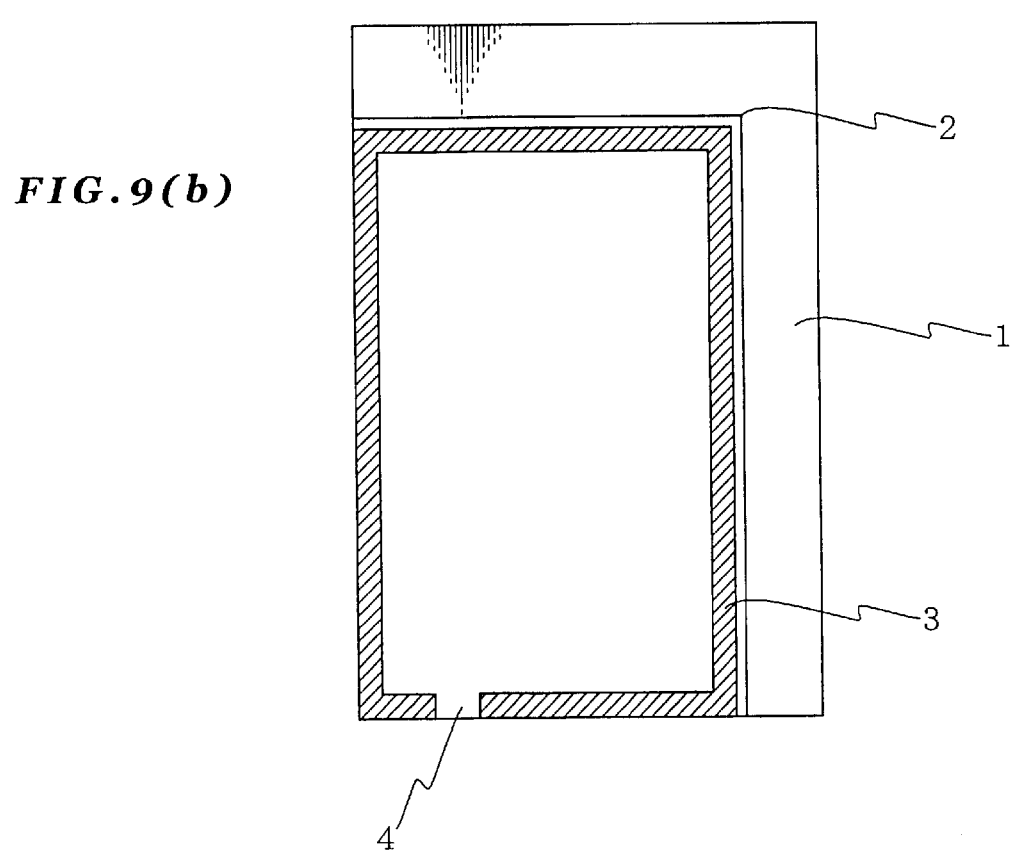
FIG. 9(b) gives a front view of a display panel.
Figure 10:
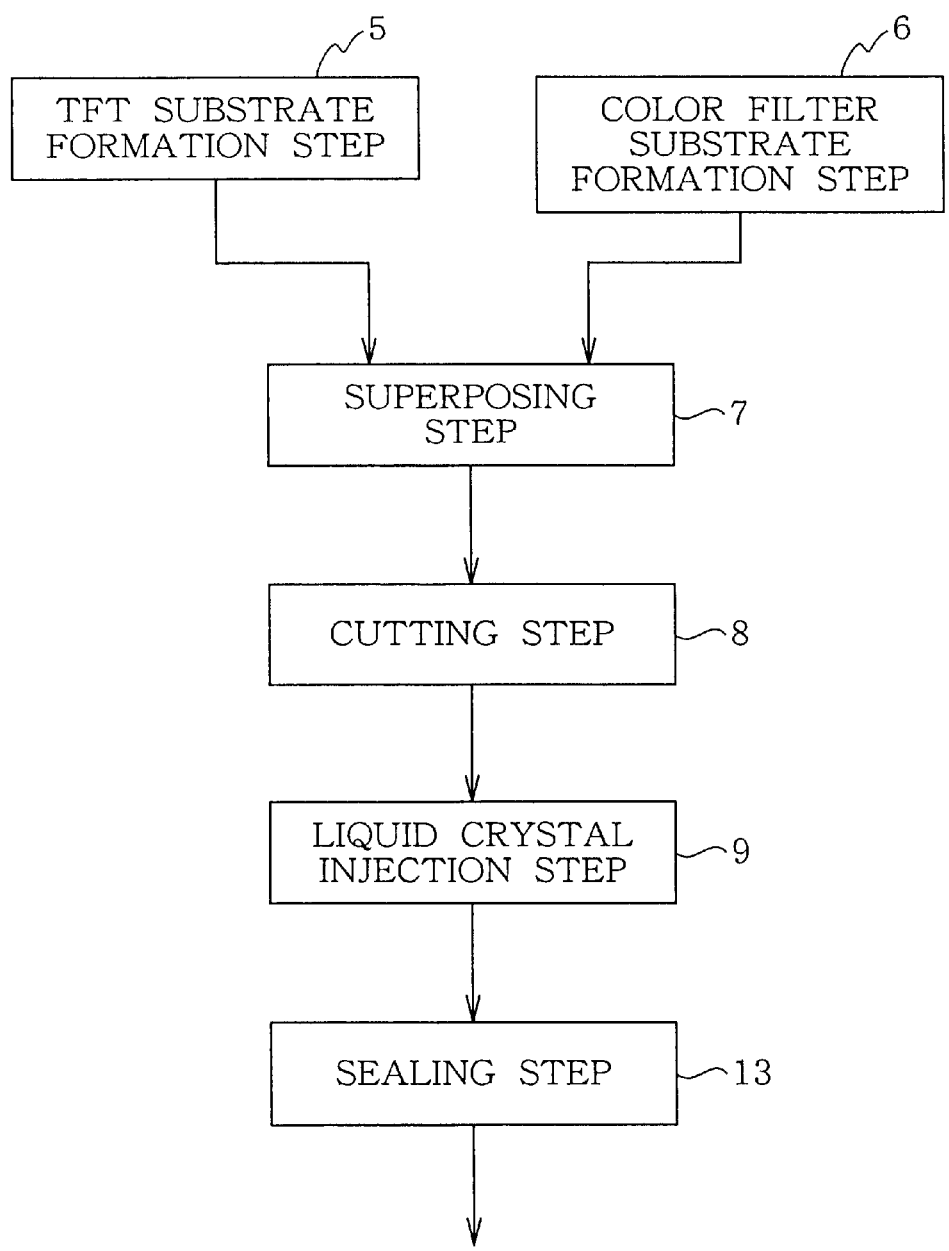
FIG. 10 is a block diagram showing a display panel production procedure.
Figure 11:
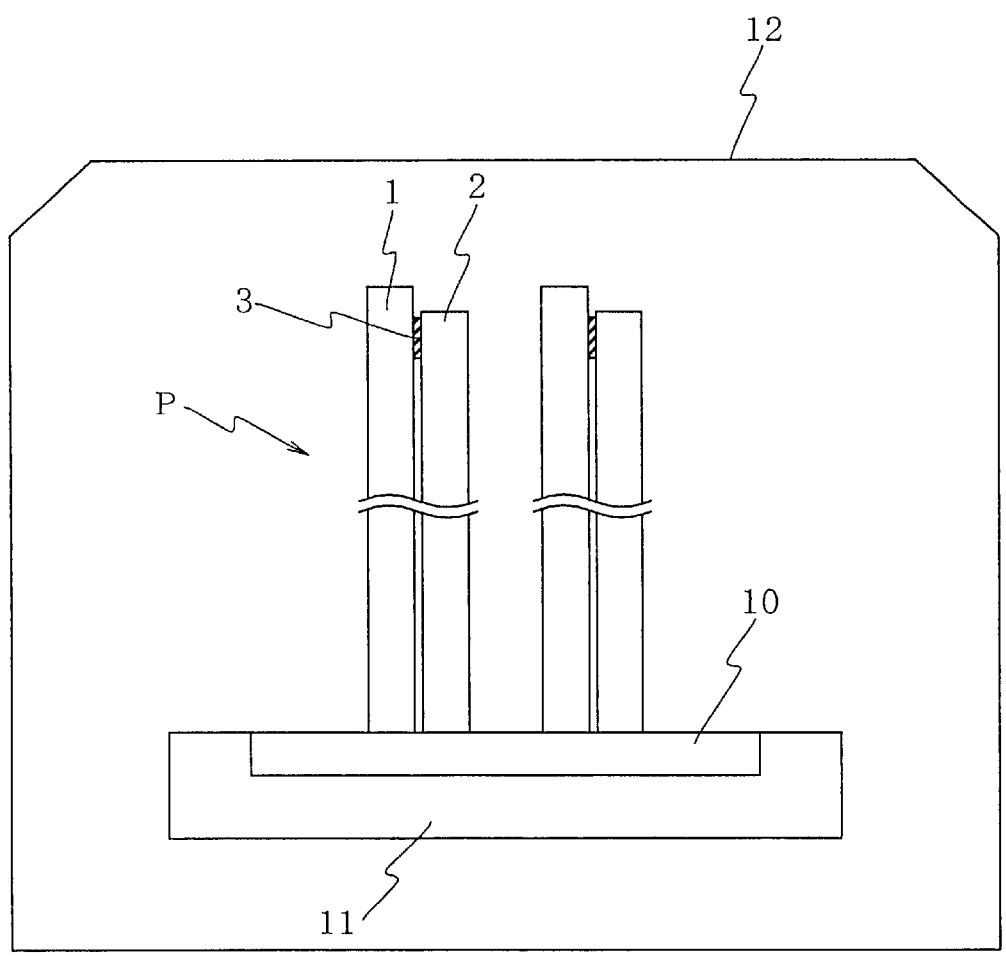
FIG. 11 is a cross sectional view of liquid crystal injection step for a display panel.

It should be noted that as shown in the block diagram of FIG. 8B, the liquid crystal panel production line may include a single relocation apparatus A in the relocation step area 84. In this case, the single relocation apparatus A performs relocation of 80 liquid crystal panels from the two cassettes ejected from the cutting step area 81, into a single empty cassette to be supplied to the injection step area 82, and the relocation of the 80 liquid crystal panels from the single cassette into two empty cassettes to be fed to the sealing step area 83. The number of relocation apparatuses may be selectively determined, considering the production efficiency of the liquid crystal panel production line.

Next, explanation will be given on operation of the display panel relocation apparatus arranged on the liquid crystal panel production line as shown in FIG. 8 A.

Firstly, the filled cassette 22a exhausted from the cutting step area 81 is conveyed to the relocation apparatus A. That is, as shown in FIG. 1, the filled cassette 22a containing 40 pieces of the display panels 21 in the longitudinal direction of the relocation apparatus A is placed on the 1st station ST1 of the filled cassette of the filled cassette supply mechanism 27. The filled cassette 22a placed on the 1st station ST1 is successively conveyed to the 5th station ST5 by an intermittent feed mechanism (not depicted). The stop position of the filled cassette 22a on the 5th station ST5 is corrected by the cassette positioning mechanism 39 provided in the installation basement 33 and the cassette positioning mechanism (not depicted) provided on the lateral feed mechanism 46.

Next, as shown in FIG. 3, the display panel vertical movement mechanism 45 arranged below the 5th station ST5 is lifted up to the bottom of the display panel 21 in the filled cassette 22a and supports the bottom of the display panel 21. Moreover, the plates 58 of the display panel top support mechanism 47 are lowered so that the teeth of the comb-shaped plates 58 are inserted between the display panels. Here, because the display panel relocation unit 26 is installed with inclination of about 1 degree toward the empty cassette conveying unit 25, insert of the comb teeth can be performed easily. And the plate 58b is slightly slid with respect to the plate 58a, so that the display panels 21 have an identical pitch at their tops, and the tops of the display panels 21 are supported. With this identical pitch, the display panels 21 are taken out of the cassette or placed in the cassette without making contact between the display panels 21 and the surface of the grooves 74 of the display panel holding plate 72. This enables to smoothly relocate the display panels 21 without causing cracks or other breakage in the display panels 21.

Next, supporting the bottom or top of the display panels 21, the display panel vertical movement mechanism 45 and the plate 58 of the display panel top support mechanism 47 are lifted in a synchronized manner. After this, as shown in FIG. 2, the display panel holding mechanism 48 slides to support the bottom and side ends of the display panels 21 at the bottom receiving roller 62 and the side receiving roller 63. Moreover, the display panel side pitch correction mechanism 49 also slides and the two-plated comb teeth of the plate 69 are inserted between the display panels of the display panel 21. The plate 69b slightly slide with respect to the plate 69a, so that the side ends of the display panels 21 have an identical pitch. With this identical pitch, the display panels 21 can be taken out or placed into a cassette without making contact with the surface of the grooves 74 of the display panel holding plate 72. Thus it is possible to smoothly relocate the display panels 21 without causing cracks or other breakage.

After supporting the tops, bottoms, and both side ends of the display panels 21, the display panel vertical movement mechanism 45 is lowered and the display panels 21 are taken out all at once from the filled cassette 22a. The empty cassette 24b is conveyed to the 9th station ST9 and removed from the display panel relocation apparatus. Note that the display panel vertical movement mechanism 45 which has been lowered moves along the slide guide 54 provided in the installation basement 33 up to a location below the 14th station ST14.

Next, while the display panels 21 are supported as is described above, the lateral feed mechanism 46 slides up to a location above the 14th station ST14. On the other hand, the empty cassette 24a placed on the 10th station ST10 is conveyed up to the 14th station ST14. During this conveying, at the 12th station ST12, the empty cassette 24a is rotated by 90 degrees by the cassette rotary mechanism 30. Similarly as the filled cassette 22a, after the empty cassette 24a is conveyed to the 14th station ST14, its stop position is corrected by the cassette positioning mechanism 39 provided in the installation basement 33 and a cassette positioning mechanism (not depicted) provided in the lateral feed mechanism 46. Here, the empty cassette 24a stops at such a position that when the 40 display panels 21 supported above the 14th station ST14 are lowered, they are placed in the first half (in the feed direction) of the empty cassette 24a.

The display panels 21 are placed into the empty cassette 24a as follows. Firstly, the display panel vertical movement mechanism 45 which has moved to the location below the 14th station ST14 is lifted so as to support the bottoms of the display panels 21. Next, the display panel holding mechanism 48 and the display panel side pitch correction mechanism 49 slide outwardly. Then, the display panel vertical movement mechanism 45 and the plate 58 of the display panel top support mechanism 47 are lowered in a synchronized manner. In the display panel top support mechanism 47, the two-plated come-shaped plate 58 releases its locking state and the plate 58 is lifted. Moreover, the display panel vertical movement mechanism 45 is lowered, thus completing the storage of the display panels 21.

Next, the empty cassette 24a containing 40 display panels 21 advances by half of its length. After this, the aforementioned relocation operation of the display panel relocation mechanism 34 is repeated for the 40 display panels 21 contained in the next filled cassette 22a conveyed to the 5th station ST5. Thus, the empty cassette 24a contains 80 display panels 21 and the empty cassette 24a becomes the filled cassette 22b. The filled cassette 22b is rotated by 90 degrees at the 16th station ST16 and conveyed to the 18th station ST18. The filled lid cassette taken out of the 18th station ST18 is supplied to the injection step area 82.

Thus, the filled cassette 22b containing 80 display panels 21 is subjected to liquid crystal injection in the injection step area. After the liquid crystal injection, the filled cassette 22b containing the display panels 21 is conveyed to the relocation apparatus B. That is, although not depicted, the filled cassette 22b is placed on the 1st station ST1 of the relocation apparatus B. It should be noted that the relocation apparatus B has an identical configuration as the relocation apparatus A.

In the relocation apparatus B, the 80 display panels in the filled cassette 22b are relocated into two empty cassettes, 40 display panels per cassette. The relocation operation is almost identical to the relocation apparatus A and its explanation is omitted. However, in the display panel relocation mechanism 34, 40 display panels are relocated by one cycle of relocation operation and the rotary mechanism 30 is matched with this cycle. Moreover, the display panels relocated by the relocation apparatus B have bottoms stained with liquid crystal. The liquid crystal attached to the bottom receiving roller 62 and the display panel support roller 50 are removed by the wiper mechanisms 43 and 44.

The filled cassette containing 40 display panels 21 is conveyed to the sealing step area 83 for sealing the liquid crystal injection opening.

As has been described above, in the display panel production line according to the present invention, it is possible to increase the number of liquid crystal panels which can be processed in the liquid crystal injection step in comparison to the unit number of liquid crystal panels processed in the cutting step and the sealing step. Besides, this invention can be used without modifying the cassette currently used in the cutting step and the sealing step.

As a result, when it is necessary to increase the unit number of liquid crystal panels in the liquid crystal injection step, considering the liquid crystal panel types and the production efficiency as the entire production line, it is possible to increase the unit number of the liquid crystal panels in the relocation step area, and when there is no need of increase the unit number of liquid crystal panels, it is possible not to use the relocation step area. The production line can have such a flexibility.

Accordingly, even when using the conventional production line as it is, it is possible to improve the efficiency of the liquid crystal panel production step and the production line without increasing the number of liquid crystal injection apparatuses and without affecting the other existing step and the production line.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-002546 (Filed on Jan. 8th, 1999) including specification, claims, drawings and summary are incorporated herein by reference in its entirety.

What is claimed is:

1. A display panel production line comprising:
   a cutting step area for cutting a glass substrate into a display panel size; an injection step area for injecting liquid crystal into the display panel; and
   a sealing step area for sealing a liquid crystal injection opening of the display panel which has been filled with the liquid crystal;
   wherein predetermined cassettes are used as a medium to contain and convey the display panel between the areas;
   the display panel production line further comprising a relocation area for converting the number of display panels contained in the predetermined cassettes.

2. A display panel production line as claimed in claim 1, wherein the relocation step area includes a first display panel relocation apparatus for relocating display panels in a first cassette ejected from the cutting step area, into a second cassette, while increasing the number of panels in said second cassette.

3. A display panel production line as claimed in claim 1, wherein the relocation step area includes a display panel relocation apparatus for relocating display panels in a first cassette into a second cassette supplied to the sealing step area, while decreasing the number of panels in said second cassette.

4. A display panel production line as claimed in claim 2, wherein the relocation step area includes a second display panel relocation apparatus for relocating display panels in a first cassette into a second cassette supplied to the sealing step area, while decreasing the number of panels in said second cassette.

5. A display panel production line as claimed in claim 4, wherein the first display panel relocation apparatus and the second display panel relocation apparatus are constituted by a single display panel relocation apparatus.

6. A display panel production line as claimed in claim 2, wherein the display panel relocation apparatus comprises:
- a filled cassette supply mechanism for supplying a cassette containing the display panels in the longitudinal direction;
- an empty cassette exhaust mechanism for exhausting an empty cassette from which the display panels have been removed; an empty cassette supply mechanism for supplying a cassette to which the display panels are to be relocated;
- a filled cassette exhaust mechanism for exhausting the cassette to which the display panels have been relocated; and
- a display panel relocation unit for taking out display panels at a take-out station located at a transfer position between the filled cassette supply mechanism and the empty cassette exhaust mechanism and storing the display panels at a storage station located at a transfer position between the empty cassette supply mechanism and the filled cassette exhaust mechanism.

7. A display panel production line as claimed in claim 6, wherein the display panel relocation unit is arranged almost at the center of the display panel relocation apparatus, so as to be sandwiched by a cassette supply entrance of the filled cassette supply mechanism and a cassette exit of the filled cassette exhaust mechanism on one side and a cassette exit of the empty cassette exhaust mechanism and a cassette supply entrance of the empty cassette supply mechanism on the other side.

8. A display panel production line as claimed in claim 6, the take-out station and the storage station have a cassette feed mechanism for modifying the position for taking out the display panels from the cassette at the take-out station and the position for storing the display panels into the cassette at the storage station.

9. A display panel production line as claimed in claim 6, wherein the cassette supply mechanism and the cassette exhaust mechanism each have a cassette rotation mechanism for rotating the cassette.

10. A display panel production line as claimed in claim 6, wherein the cassettes have identical external dimensions.

11. A display panel production line as claimed in claim 10, wherein the cassettes are constituted by a pair of outer frames, a plurality of slide shafts bridged between the outer frames, and a pair of display panel holding plates for holding the display panels, and; at least one of the display panel holding plates can slide on the slide shaft and can be fixed at an arbitrary position.

12. A display panel production line as claimed in claim 6, wherein the display panel relocation unit includes:
- a display panel vertical movement mechanism which can move between a location below the take-out station and a location between the storage station and support the bottoms of the display panels so as to take out upward the display panels from the cassette or store downward the display panels;
- a display panel holding mechanism for holding the bottoms and sides of the display panel taken out of the cassette; and
- a lateral feed mechanism which can move from a location above the take-out station to a location above the storage station.

13. A display panel production line as claimed in claim 12, wherein the display panel vertical movement mechanism includes a display panel support roller which can move along the bottom of the display panels.

14. A display panel production line as claimed in claim 13, wherein a wiper mechanism for removing stains from the display panel support roller is provided below the take-out station and below the storage station.

15. A display panel production line as claimed in claim 12, wherein the display panel top support mechanism includes a display panel top pitch correction mechanism having a two-plate comb-shaped member in which one plate can be slightly shifted with respect to the other plate.

16. A display panel production line as claimed in claim 12, wherein the display panel holding mechanism includes a bottom receiving roller for supporting the bottom of the display panels and a side receiving roller for supporting the sides of the display panels.

17. A display panel production line as claimed in claim 16, wherein the wiper mechanism for removing stains from the bottom receiving roller is arranged at both ends of the lateral movement stroke orbit of the lateral feed mechanism.

18. A display panel production line as claimed in claim 12, wherein the display panel relocation unit includes a display panel side pitch correction mechanism having a two-plate comb-shaped member in which one plate can be slightly shifted with respect to the other plate.

19. A display panel production line as claimed in claim 6, wherein the display panel relocation unit is arranged with an inclination of small angle in the pitch direction of the display panels.

20. A display panel production line as claimed in claim 6, the display panel production line further comprising a cassette positioning mechanism for correcting a stop position of the cassette at the take-out station and the storage station.

* * * * *